(12) United States Patent
Kondo et al.

(10) Patent No.: US 9,434,063 B2
(45) Date of Patent: Sep. 6, 2016

(54) HANDLE PORTION OF HAND-HELD ELECTRIC TOOL

(71) Applicants: Tomoyuki Kondo, Anjo (JP); Manabu Sugimoto, Anjo (JP); Miyabi Ito, Anjo (JP); Eiji Kondo, Anjo (JP)

(72) Inventors: Tomoyuki Kondo, Anjo (JP); Manabu Sugimoto, Anjo (JP); Miyabi Ito, Anjo (JP); Eiji Kondo, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 658 days.

(21) Appl. No.: 13/678,023

(22) Filed: Nov. 15, 2012

(65) Prior Publication Data

US 2013/0112451 A1 May 9, 2013

Related U.S. Application Data

(63) Continuation of application No. 12/676,781, filed as application No. PCT/JP2008/065742 on Sep. 2, 2008, now Pat. No. 8,353,364.

(30) Foreign Application Priority Data

Sep. 14, 2007 (JP) ................. 2007-239121
Dec. 19, 2007 (JP) ................. 2007-327217

(51) Int. Cl.
  B25F 5/02 (2006.01)
  H01M 2/10 (2006.01)
  B25F 5/00 (2006.01)

(52) U.S. Cl.
  CPC ............... *B25F 5/029* (2013.01); *B25F 5/00* (2013.01); *B25F 5/02* (2013.01); *H01M 2/1022* (2013.01); *H01M 2/1055* (2013.01)

(58) Field of Classification Search
  CPC .. H01M 2/10; H01M 2/1022; H01M 2/1055; H01M 10/425; H01M 10/46; H01R 13/18; H01R 23/10; H02J 7/00; H02J 7/0031; B23B 45/02; B25F 5/02

USPC ........ 173/170, 217, 171; 320/107, 112, 114, 320/122, 150; 310/47, 50; D13/102, 103, D13/104, 106
  See application file for complete search history.

(56) References Cited

U.S. PATENT DOCUMENTS 3,999,110 A * 12/1976 Ramstrom et al. ........... 320/112
4,751,452 A * 6/1988 Kilmer ................. H01R 43/033
                                              310/50

(Continued)

FOREIGN PATENT DOCUMENTS

AU    2007100381 A4   6/2007
DE    10 2005 036 449 A1   2/2007

(Continued)

OTHER PUBLICATIONS

Jun. 3, 2014 Search Report issued in European Patent Application No. 13155821.5.

(Continued)

*Primary Examiner* — Scott A. Smith
(74) *Attorney, Agent, or Firm* — Oliff PLC

(57) ABSTRACT

Three battery cells can be arranged such that one battery cell is situated on the front side of a handle portion and that the remaining two battery cells are situated on the rear side thereof while being arranged laterally side by side. Also, a handle portion can be generally of a triangular cross-sectional configuration whose apex portion is situated on the front side of the handle portion and whose base portion is situated on the rear side thereof; and the handle portion is grasped by bringing fingertips into contact with the apex portion (11a) on the front side.

20 Claims, 3 Drawing Sheets

(56) References Cited

U.S. PATENT DOCUMENTS

| | | | |
|---|---|---|---|
| 4,829,226 A * | 5/1989 | Nakamura et al. | 320/112 |
| D323,642 S * | 2/1992 | Liao | D13/119 |
| 5,099,705 A | 3/1992 | Dravnieks | |
| 5,213,913 A | 5/1993 | Anthony, III et al. | |
| 5,353,208 A | 10/1994 | Moore | |
| 5,589,288 A * | 12/1996 | Coulson | H01M 2/1055 30/500 |
| 5,769,657 A * | 6/1998 | Kondo et al. | 439/500 |
| 5,903,423 A * | 5/1999 | Okano et al. | 361/103 |
| 5,911,497 A | 6/1999 | Mele | |
| 6,976,313 B2 | 12/2005 | Wong | |
| D528,975 S * | 9/2006 | Chi et al. | D13/103 |
| 7,134,364 B2 * | 11/2006 | Kageler | B25F 5/00 173/216 |
| 7,161,166 B2 * | 1/2007 | Yasuda | 250/584 |
| D537,779 S * | 3/2007 | Tsai et al. | D13/119 |
| D547,264 S * | 7/2007 | Kondo | D13/103 |
| 7,273,159 B2 * | 9/2007 | Brotto | 227/1 |
| 7,395,873 B2 * | 7/2008 | Nakamura et al. | 173/93.5 |
| 7,554,290 B2 * | 6/2009 | Johnson et al. | 320/112 |
| D597,482 S * | 8/2009 | Kondo et al. | D13/103 |
| 7,588,471 B2 * | 9/2009 | Rejman | H01M 2/1055 439/680 |
| 7,619,387 B2 * | 11/2009 | Amend et al. | 320/107 |
| 7,969,116 B2 * | 6/2011 | Aradachi et al. | 320/114 |
| 8,353,364 B2 * | 1/2013 | Kondo et al. | 173/217 |
| 8,415,046 B2 * | 4/2013 | Kondo | 429/98 |
| 8,596,377 B2 * | 12/2013 | Kondo et al. | 173/217 |
| 8,999,542 B2 * | 4/2015 | Kondo | 429/88 |
| 2003/0205987 A1 | 11/2003 | Barlev et al. | |
| 2006/0096771 A1 * | 5/2006 | Brotto | 173/217 |
| 2006/0217729 A1 | 9/2006 | Eskridge et al. | |
| 2006/0267556 A1 | 11/2006 | Uehlein-Proctor et al. | |
| 2007/0173090 A1 | 7/2007 | Johnson et al. | |
| 2008/0187822 A1 | 8/2008 | Breitenbach | |
| 2008/0196553 A1 | 8/2008 | Hoffman et al. | |

FOREIGN PATENT DOCUMENTS

| | | |
|---|---|---|
| DE | 102005036448 A1 | 2/2007 |
| EP | 1 205 282 A2 | 5/2002 |
| GB | 2408396 A | 5/2005 |
| GB | 2418059 A | 3/2006 |
| JP | A-54-094785 | 7/1979 |
| JP | A-56-069777 | 6/1981 |
| JP | U-60-126174 | 8/1985 |
| JP | A-63-082611 | 4/1988 |
| JP | A-07-171774 | 7/1995 |
| JP | A-08-112785 | 5/1996 |
| JP | A-09-155769 | 6/1997 |
| JP | A-10-500079 | 1/1998 |
| JP | A-2002-219672 | 8/2002 |
| JP | A-2002-254355 | 9/2002 |
| JP | A-2004-098203 | 4/2004 |
| JP | A-2004-174646 | 6/2004 |
| JP | A-2005-342796 | 12/2005 |
| JP | 2006-155989 A | 6/2006 |
| JP | A-2006-155989 | 6/2006 |
| JP | A-2006-321043 | 11/2006 |
| TW | M 301736 U | 12/2006 |
| WO | WO 95/26899 | 10/1995 |
| WO | 2006/089810 A1 | 8/2006 |
| WO | 20071014840 A2 | 2/2007 |
| WO | 2008133340 A1 | 11/2008 |
| WO | 2009111743 A1 | 9/2009 |

OTHER PUBLICATIONS

Jun. 10, 2014 Search Report issued in European Patent Application No. 13155833.0.
International Search Report issued for International Application No. PCT/JP2008/065742 mailed Dec. 2, 2008 (with English-language translation).
Feb. 13, 2012 Office Action issued in U.S. Appl. No. 12/676,781.
Aug. 2, 2012 Office Action issued in U.S. Appl. No. 12/676,781.
Sep. 3, 2013 Office Action issued in Japanese Patent Application No. 2007-327217 (with translation).
http://www.amazon.com/Bare-Tool-Milwaukee-2401-20-12-Volt-Subcompact/dp/B002N2XJ8I.
http://www.amazon.com/Milwaukee-48/11/2401-LITHIUM-Lithium-ion-Cordless/dp/B001NHAZOK/ref=pd_bxgy-469_img_z.
http://demandware.edgesuite.net/aaea_prd/on/dernandware.static/Sites-Milwaukee-Site/sites-cpo-master-catalog/default/dwa6b8481b/product_media/mil/miln2401-20/documents/miln2401-20_manual.pdf.
http://www.manualslib.com/manual/104009/Milwaukee-2401-20.html.
http://www.ereplacementpartscom/milwaukee-240120-ser-b30a-compact-driver-parts-c-131_136_7739.html.
http://www.milwaukeetool.com/acessories/batteries-and-chargers/48/11/2401.
http://documents.milwaukeetool.com/58-14-2402d10.pdf.
Aug. 17, 2015 Notice of Opposition of Opponent I issued in European Application No. 08830658.4.
Aug. 17, 2015 Letter from the Opponent issued in European Application No. 08830658.4.
Aug. 17, 2015 Notice of Opposition of Opponent II issued in European Application No. 08830658.4.

* cited by examiner

HANDLE PORTION OF HAND-HELD ELECTRIC TOOL

CROSS REFERENCE TO RELATED APPLICATIONS

This application is a continuation of U.S. patent application Ser. No. 12/676,781 filed Apr. 7, 2010, which is a U.S. National Stage Application of International Patent Application No. PCT/JP2008/065742 filed Sep. 2, 2008, which claims the benefit of priority to Japanese Patent Application No. 2007-327217 filed Dec. 19, 2007 and to Japanese Patent Application No. 2007-239121 filed Sep. 14, 2007, the contents of which are incorporated herein by reference in their entirety.

TECHNICAL FIELD

This invention relates to a handle portion of a hand-held electric tool that is held with a hand during use.

BACKGROUND ART

As an electric tool, such as a battery type drilling tool, which is equipped with a handle portion provided so as to protrude sidewise from a side portion of a generally columnar tool main body, there has been provided a tool whose handle portion is loaded with a battery pack as the power source.

Regarding such a hand-held, battery type electric tool, the following patent document, for example, DE 10 2005 036 449 A1, discloses a technique related to a lock mechanism for fixing a battery pack having three columnar battery cells in position in a battery accommodation space in a handle portion.

SUMMARY OF THE INVENTION

However, according to the technique disclosed in the above-mentioned patent document, there is also a battery pack in which the three battery cells are arranged not laterally side by side but in a triangular fashion, with the three battery cells being situated at the apexes of a triangle, and this battery pack is loaded such that the front surface side of the handle portion constitutes a flat surface. Thus, the fingertips of the hand holding the handle portion are held in contact with the flat surface, whereas the palm of the hand is held in contact with an apex of the triangle, resulting in a handle configuration which is rather hard to grasp for the user grasping the handle portion.

In the case, in particular, of a small hand-held electric tool, the operation is usually performed with the electric tool supported with one hand grasping the handle portion, so that the workability may greatly depend on the grasping feel (how it is felt when grasped, or ease of grasping). In the case, for example, of a drilling tool, since the handle portion is hard to grasp, it is rather hard for the user to apply force (pressing force) through his hand when pressing the forward end tool against the workpiece, which impairs the workability.

Therefore, there is a need in the art for enhancing the operability (usability) of an electric tool by improving the grasping feel of a handle portion.

In one aspect of the present invention when a cross-sectional configuration of the handle portion is assumed to be a triangle, an apex portion of the triangle is situated on a fingertip side of a grasping hand, and a base of the triangle is situated on a palm side. That is, the apex portion of the triangle is situated on the front surface side that is the forward end side of the tool main body, and the base of the triangle is situated on the rear surface side. Thus, when the user grasps this handle portion, the fingertips are brought into contact with the apex portion side, and the palm is brought into contact with the base side, so that it is possible to improve the grasping feel, and at the same time, it is easier for the requisite force to be applied when a tool bit attached to the forward end of the tool main body is to be pressed against a workpiece, whereby it is possible to improve the operability or usability of the electric tool.

Here, regarding the cross-sectional configuration of the handle portion, the term "triangle" is not restricted to a mathematically exact triangle but may include one having sides curved to generally form a circular configuration but having in its periphery three portions that may be regarded as apex portions (corner portions of an arcuate sectional configuration) due to their increased curvature (reciprocal of the radius of curvature) and allows it to be regarded generally as a triangle. If anything, the handle portion of a hand-held tool corresponds to the latter type of triangle. As a result, when the user grasps the handle portion, the fingertips are brought into contact with a portion corresponding to an apex portion with large curvature, and the palm is brought into contact with a portion corresponding to the base with smaller curvature. In this case, the user finds the handle portion easier to grasp, with the grasping feel thereof being thus enhanced.

Further, since the palm is held in contact with a portion corresponding to the base of the triangle, it is easier to apply force when pressing the electric tool against the work, whereby it is possible to enhance the operability or usability of the electric tool.

In another aspect of the present invention, the handle portion can be loaded with a battery pack having three battery cells and has a triangular cross-sectional configuration in correspondence with a triangular arrangement, in which one battery cell of the three battery cells is arranged on a front side and the other two battery cells are arranged on a rear side of the one battery cell while being arranged laterally side by side. That is, in the case of a battery pack in which three battery cells are arranged not laterally side by side but in a triangular fashion in a pyramid-like form, the battery pack generally exhibits a triangular cross-sectional configuration. An apex of this triangular cross-sectional configuration is situated on the front surface side of the handle portion, and the base thereof is situated on the rear surface side; in correspondence with this, it is possible to arrange a portion with large curvature of the cross-sectional configuration of the handle portion (a portion corresponding to an apex of the triangle) on the front surface side, and to situate a portion with small curvature (a portion corresponding to the base of the triangle) on the rear surface side (the user side).

Since a portion of large curvature is situated on the front surface side of the handle portion, and the fingertips are held in contact with this portion, the user feels the handle portion easier to grasp, so that it is possible to enhance the grasping feel thereof.

Further, on the front side as seen from the user, there is situated a surface of smaller curvature (a curved surface more akin to a flat surface), and the palm is held in contact with this portion akin to a flat surface, so that it is easier for the user to apply a pressing force to the electric tool to press it against the work, which helps to improve the operability or usability of the electric tool.

In another aspect of the present invention, the handle portion has three battery cells disposed therein and has a triangular cross-sectional configuration in correspondence with a triangular arrangement, in which one battery cell of the three battery cells is arranged on a front side and the other two battery cells are arranged on a rear side of the one battery cell while being arranged laterally side by side. The apex portion of the triangle is situated on a front side and the base of the triangle is situated on a rear side with respect to a tool main body. With this arrangement, also in the battery cell containing type, it is possible to obtain the same effect as that of the battery pack type described above.

In another aspect of the present invention, the battery pack has three battery cells, one battery cell of the three battery cells is situated on a front side of a tool main body, and the remaining two battery cells are situated on a rear side of the tool main body while being arranged laterally side by side. Thus, conversely to the prior art, the three battery cells are arranged in a triangular configuration (in a pyramid form) such that the apex portion is situated on the front side of the handle portion, with the base being situated on the rear side, so that the cross-sectional configuration of the handle portion can be of a generally triangular configuration which is peaked on the front side (a curved surface of large curvature) and which is curved more gently on the rear side (a curved surface of small curvature). As a result, the handle portion to he loaded with the battery cells can be formed in a cross-sectional configuration that is easy to grasp, thereby improving the operability and usability of the electric tool.

In other aspect of the present invention, a battery pack is configured such that the battery pack has a pair of right and left fixation claw portions to be engaged with the handle portion, the fixation claw portions are equipped with finger-rest portions inclined in such directions that they approach to each other toward the apex portion, and the engagement with the handle portion is canceled by pressing the finger-rest portions with fingertips in such directions that they approach to each other. Further the battery pack is configured such that the finger-rest portions are provided with anti-slip portions for preventing the fingertips from slipping toward the apex portion. Therefore, the fixation claw portion releasing operation can be performed reliably and easily. In the case in which the right and left finger rest portions are, inclined in such directions that they approach to each other toward the apex portion side, when both finger-rest portions are pushed by fingertips, the fingertips are likely to slip toward the apex portion side, thus making it rather hard to perform the releasing operation. In this respect, anti-slip portions are provided on the finger rest portions so that the fingertips may not slip toward the apex portion side, whereby it is possible to reliably perform pushing operation on both finger-rest portions and, by extension, it is possible to quickly perform the operation of releasing the right and left fixation claw portions, thus facilitating the detachment of the battery pack.

DETAILED DESCRIPTION OF THE INVENTION

Figure 1:
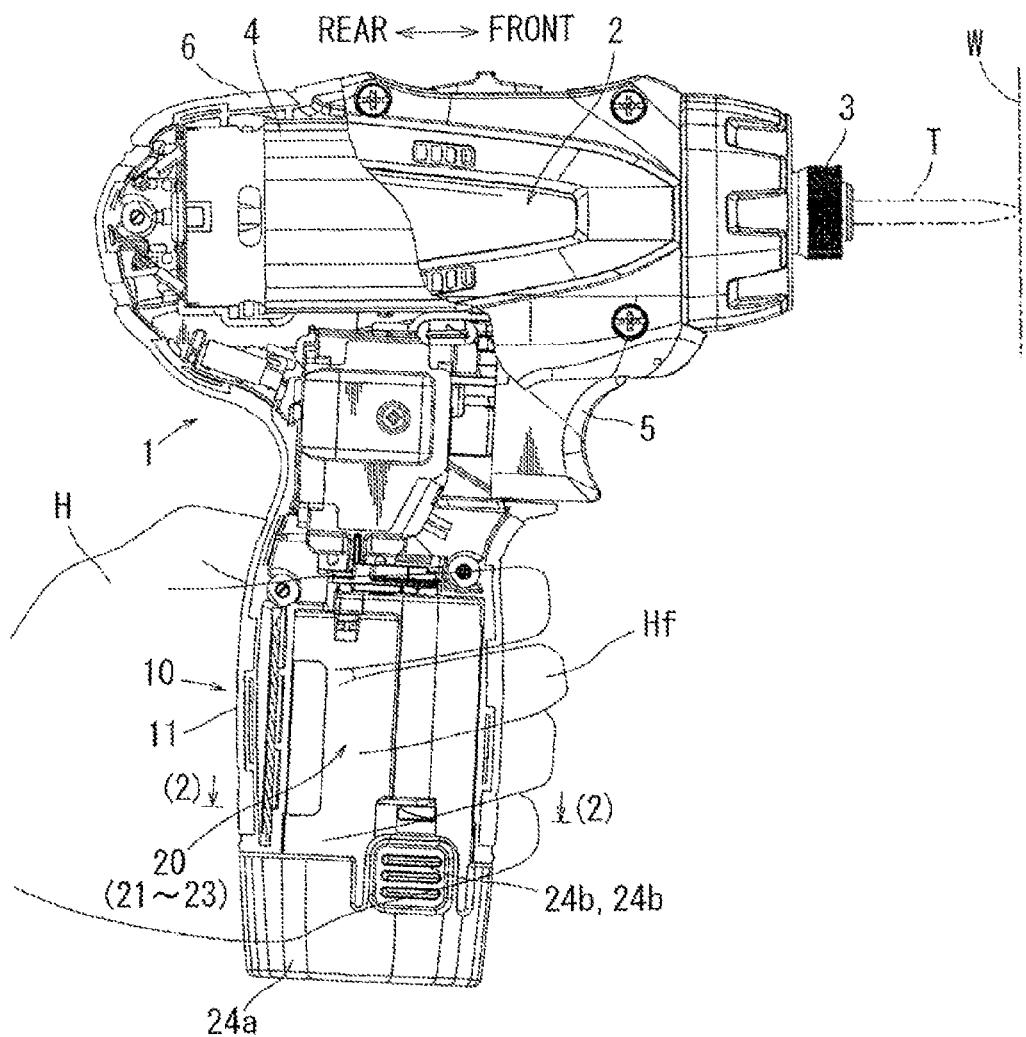
FIG. 1 A general side view of an electric tool equipped with a handle portion according to the embodiment shown. The drawing shows the general inner structure of the rear portion side of the tool main body and the handle portion.

Next, an embodiment of the present invention will be described with reference to FIGS. 1 and 2. FIG. 1 is a general view of a hand-held type electric tool 1 equipped with a handle portion 10 according to the embodiment. In this embodiment, as an example of the hand-held type electric tool 1, there is shown a relatively small drilling tool. In the following description, regarding the directions of the members, portions, etc., the direction in which drilling is performed will be referred to as the front side or forward end side, and the direction opposite thereto will he referred to as the rear side.

The electric tool 1 is equipped with a tool main body 2 of a generally columnar configuration. The handle portion 10 is provided so as to protrude from a side portion of the tool main body 2. A main body housing 6 of the tool main body 2 and a handle housing 11 of the handle portion 10 are formed integrally with each other.

At the forward end (the right-hand end in FIG. 1) of the tool main body 2, there is provided a chuck 2 for attaching a tool bit T. By pressing the tool bit T against a workpiece W, the workpiece W is drilled. The tool main body 2 has an electric motor 4 disposed therein. Using the electric motor 4 as the drive source, the tool bit T rotates about its axis. The electric motor 4 is started by pulling a trigger type switch lever 5 arranged on the front side of the base portion of the handle portion 10 with a finger.

Regarding the tool main body 2, no particular modification is required in carrying out the present invention, so a detailed description thereof will be omitted.

The handle portion 10 has a thickness and a sectional configuration suited to be grasped by the user with one hand. A rechargeable type battery pack 20 is attached to the leading end portion (the lower end portion in FIG. 1) of the handle portion 10 (handle housing 11). The electric tool 1 shown is operated by using the battery pack 20 as the power source. That is, the electric motor 4 is started by using the battery pack 20 as the power source.

Figure 2:
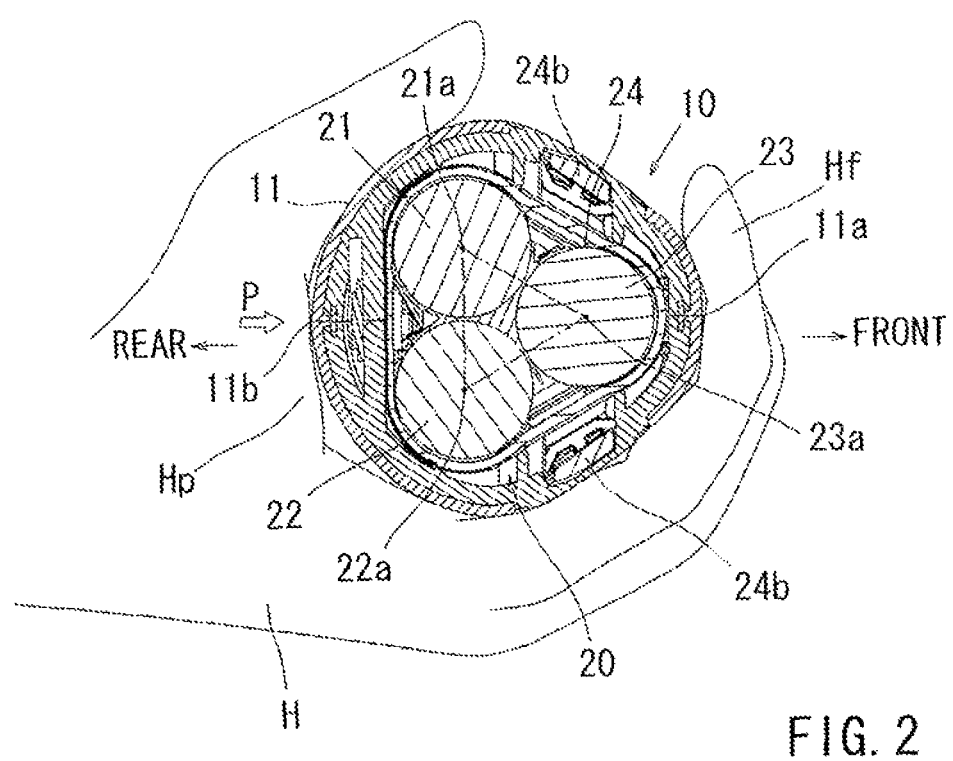
FIG. 2 A sectional view taken along the arrow line (2)-(2) of FIG. 1. The drawing illustrates a state in which the user is grasping the handle portion with the right hand.

As shown in FIG. 2, the battery pack 20 has a battery case 24 containing three battery cells 21 through 23. At the lower end portion of the battery case 24, there is provided a cover portion 24a. When the battery pack 20 is attached to the handle portion 10, the cover portion 24a serves as a cover covering the interior (battery accommodation space) of the handle housing 11. A pair of right and left fixation claw portions 24b, 24b are provided on the right-hand and left-hand side portions of the cover portion 24a. The right and left fixation claw portions 24b, 24b are engaged with the handle housing 11, whereby the battery pack 20 is maintained in the attached state. When both fixation claw portions 24b, 24b are pushed with fingertips to cancel the engagement state with respect to the battery housing 11, it is possible to remove the battery pack 20 from within the handle case 11, and to recharge the removed battery pack 20 or replace it with a new one.

The three battery cells 21 through 23 each have a columnar configuration and are arranged not laterally side by side but in a triangular fashion (in a pyramid form) with the battery cells being situated at positions corresponding to the apexes of a triangle. In the following, this arrangement will also be referred to as the triangular arrangement. As shown in the drawing, in this example, the battery cells 21 through 23 are arranged in a triangular fashion in such a relationship that the center axes 21a through 23a of the battery cells 21 through 23 are situated at the respective apexes of an equilateral triangle.

Due to the above-described triangular arrangement of the three battery cells 21 through 23, the battery case 24 also has a generally triangular cross-sectional configuration. However, the three corner portions (which are situated at the positions corresponding to the apexes of the triangle) of the battery case 24 are formed as arcuate surfaces curved with curvatures in conformity with the peripheral surfaces of the battery cells 21 through 23. In the description of this specification and the claims, "triangular" refers to also this configuration. In this triangular arrangement, one battery cell 23 is arranged on the front side, and the remaining two battery cells 21, 22 are arranged laterally side by side on the rear side thereof, with the battery cells being in contact with each other.

The handle housing 11 is also of a generally triangular cross-sectional configuration in correspondence with the battery case 24, in which the three battery cells 21 through 23 are arranged in a triangular fashion and which, consequently, has a triangular cross-sectional configuration, and eventually, in correspondence with the battery pack 20. The battery pack 20 is loaded in the handle housing 11, with its portion corresponding to the apex of the triangle being situated on the front side, and the portion corresponding to the base of the triangle being situated on the rear side. Thus, the handle housing 11 has a generally triangular cross-sectional configuration, with an apex portion 11a of a large curvature being situated on the front side, and a base portion 11b of a smaller curvature being situated on the rear side.

Therefore, when the user grasps the handle portion 10, the fingertips are brought into contact with the apex portion 11a on the front side, and the palm is brought into contact with the base portion 11b on the rear side, so that, as compared with that of the prior-art construction, which is of a reverse arrangement, the handle portion is easier to grasp.

The handle portion 10 of this embodiment, constructed as described above, has a generally triangular cross-sectional configuration, with the apex portion 11a nearer to an acute angle (of a larger curvature) being situated on the front side, and the base portion 11b nearer to a flat surface (of a smaller curvature) being situated on the rear side. Thus, as shown in FIG. 2, the user can grasp the handle portion 10 with one hand H, with the fingertips Hf being hooked on the apex portion 11a, and the palm Hp being pressed against the base portion 11b, so that it is possible to grasp the handle portion 10, resulting in a more satisfactory grasping feel than in the prior art.

Further, since it is possible to grasp the handle portion, with the palm Hp being pressed against the base portion 11b on the rear side, which is nearer to a flat surface, it is easier to apply a pressing force P to the handle portion 10, which is necessary to be applied to the electric tool 1 for a drilling operation, and therefore, it is possible to improve the operability and usability of the electric tool 1 in this respect.

The above-described embodiment can be carried out in various modified forms. As described above, the battery pack 20 can be removed from within the handle case 11 by canceling the engagement state with respect to the battery housing 11 by pushing the right and left fixation claw portions 24b, 24b with fingertips. As shown in FIG. 2, the finger-rest portions of the right and left fixation claw portions 24b, 24b are arranged to extend along two side surfaces of the triangular sectional configuration, with the result that they are arranged so as to be inclined in such directions that they approach to each other toward the apex portion 11a of the battery housing 11. For this reason, in some cases, when the finger-rest portions of the right and left fixation claw portions 24b, 24b are pressed so as to be held from both sides by, for example, the thumb and the index finger, the fingertips may slip on the finger-rest portions toward the apex portion 11a to make the pushing operation difficult since the finger-rest portions are not orthogonal to the pressing directions but are inclined with respect thereto at relatively large angles.

Figure 3:
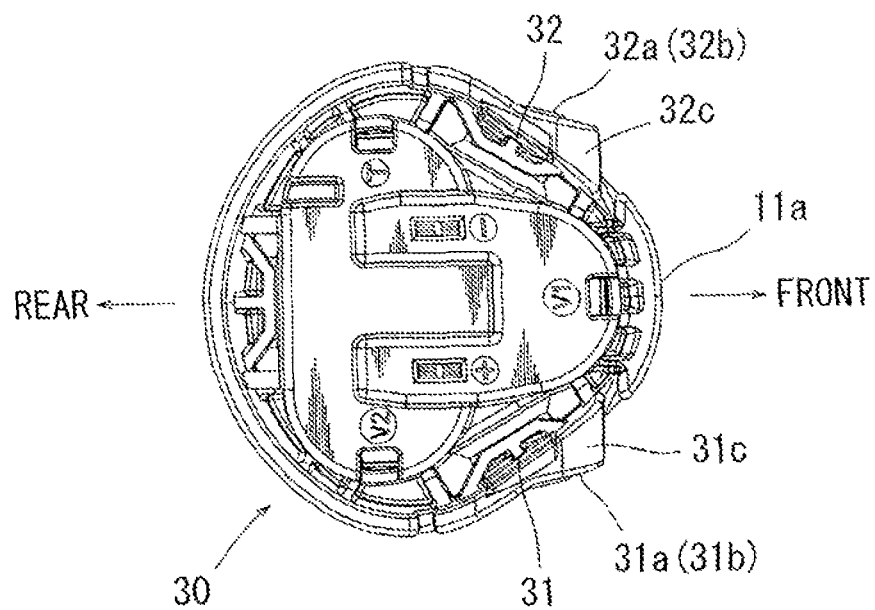
FIG. 3 A cross-sectional view of a battery pack equipped with fixation claw portions having anti-slip portions.
Figure 4:
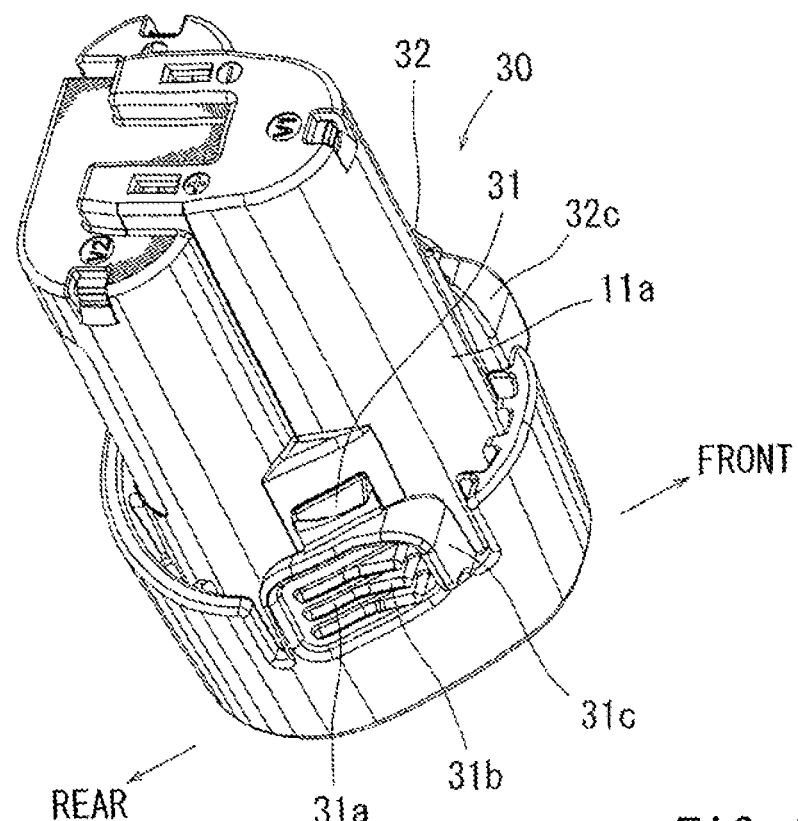
FIG. 4 A general perspective view of the battery pack equipped with fixation claw portions having anti-slip portions. The drawing shows the battery pack as detached from the handle housing.

FIGS. 3 and 4 show a battery pack 30, in which, in order to solve the above-mentioned problem, anti-slip portions 31b, 32b are respectively provided on finger-rest portions 31a, 32a of right and left fixation claw portions 31, 32. In the example shown, the anti-slip portions 31b, 32b are provided on the front side of the finger-rest portions 31a, 32a. At each of the right and left finger-rest portions 31a, 32a, three lateral ribs are arranged vertically. A range of substantially the front half of each rib protrudes sidewise, and the leading end surface thereof (the surface with which a fingertip contacts) is formed in a state of being bent into a V-shape, whereby the anti-slip portions 31b, 32b are provided.

The anti-slip portions 31b, 32b are arranged so as to be substantially parallel to each other, and are provided so as to be generally orthogonal to the pressing directions of the fingers.

Due to the anti-slip portions 31b, 32b, slipping of the fingertips toward the apex portion 11a is prevented, and it is possible to reliably press both finger-rest portions 31a, 32a, whereby it is possible to improve the usability of the battery pack 30. Around the right and left anti-slip portions 31b, 32b, there are provided guard portions 31c, 32c protruding sidewise at substantially the same height. Due to the guard portions 31c, 32c, it is possible to prevent the finger-rest portions 31a, 32a (or the anti-slip portions 31b, 32b) from being inadvertently pressed.

Also with the battery pack 30 equipped with anti-slip portions, three battery cells similar to those mentioned above are arranged in a triangular fashion, enabling the handle portion 10 to be easily grasped.

The embodiments described above allow further modifications. For example, while the battery pack 20 described above has three battery cells 21 through 23, application to the case of a battery pack having four or more battery cells is possible in the same manner. In the case of four battery cells, it is possible to form the handle portion in a generally triangular cross-sectional configuration by a pyramid-like arrangement in which one battery cell is situated on the front side, and in which three battery cells are arranged laterally side by side on the rear side. In the case of five battery cells, it is possible to realize a battery pack in which the battery cells are arranged in a generally pyramid-like configuration, by positioning one battery cell in a front row, two battery cells in a middle row, and two battery cells in a rear row.

In the case of six battery cells, it is possible to realize a battery pack in which the battery cells are arranged in a pyramid-like configuration, by arranging one battery cell in the front row, and by arranging two battery cells and three battery cells laterally side by side in the intermediate row and the rear row, respectively. Further, in the case of a battery pack accommodating six battery cells, it is possible to attain the same effect by accommodating the battery cells in two, upper and lower stages in the longitudinal direction of the handle, with three battery cells being arranged in a triangular fashion at each stage.

By arranging a plurality of battery cells in a pyramid-like (triangular) fashion in these ways, it is possible to realize a handle portion of a generally triangular cross-sectional configuration; and it is possible to attain the same effect by situating the apex portion on the front side and the base portion on the rear side. Thus, applications are possible not only to the battery pack type tool in which a battery pack accommodating three or more battery cells is loaded in the handle portion, but also to a cell containing type tool in which three or more battery cells are directly contained in the handle portion without the intermediation of a battery pack. In short, it is possible to realize a handle portion that can be more easily grasped by setting the cross-sectional configuration of the handle portion to be generally triangular, with the apex portion thereof being on the front side, and the base portion thereof being on the rear side, regardless of the cross-sectional configuration of the battery pack or the arrangement configuration of the battery cells. Thus, the present invention is also applicable to an electric tool of a type in which no battery pack is loaded in the handle portion, for example, an electric tool using an AC power source as the power source.

Further, while a drilling tool (a so-called electric drill) has been illustrated as an example of the electric tool, applications to electric tools for performing the other operations, such as a screw fastening operation, are possible.

The invention claimed is:

1. A hand-held type electric tool comprising:
   a tool main body extending in a forward and rearward direction;
   a handle housing extending downward from the tool main body;
   a chuck disposed on a front side of the tool main body;
   a switch lever disposed on the handle housing; and
   a rechargeable type battery pack; wherein:
   the handle housing is configured to receive at least a part of the rechargeable type battery pack:
   the rechargeable type battery pack includes three battery cells and a battery case;
   the three battery cells include one battery cell and two battery cells arranged on a rear side of the one battery cell;
   the battery case includes a cover portion which is attached to a lower end portion of the handle housing and a fixation claw portion, wherein the fixation claw portion can be used to attach the rechargeable type battery pack to the handle housing and the fixation claw portion is arranged so as to be capable of being grasped by the user;
   the handle housing has a substantially triangular cross sectional configuration such that the handle housing has i) an apex portion disposed on a front side of the handle housing and ii) a base portion disposed on a rear side of the handle housing,
   the lower end portion of the handle housing has an outer shape that substantially conforms to an outer shape of the cover portion of the battery case,
   in the substantially triangular cross sectional configuration, a maximum dimension of the handle housing in a direction perpendicular to the forward and rearward direction is located on a front side of a maximum dimension of the battery case where the two battery cells are disposed, and
   the fixation claw portion is located between the one battery cell and one of the two battery cells in the forward and rearward direction.

2. The hand-held type electric tool according to claim 1, wherein the fixation claw portion includes a right fixation claw disposed on a right side of the rechargeable type battery pack, and a left fixation claw disposed on a left side of the rechargeable type battery pack.

3. The hand-held type electric tool according to claim 2, further comprising an electric motor disposed within the tool main body and located on an upper side of the rechargeable type battery pack.

4. The hand-held type electric tool according to claim 2, wherein the battery case further includes a right finger-rest portion disposed on a lower side of the right fixation claw, and a left finger-rest portion disposed on a lower side of the left fixation claw.

5. The hand-held type electric tool according to claim 4, wherein the right finger-rest portion includes right ribs, and the left finger-rest portion includes left ribs.

6. The hand-held type electric tool according to claim 2, wherein the cover portion is disposed at a lower portion of the battery case and has an upper end and a lower end, and wherein the right fixation claw and the left fixation claw are both disposed above the upper end of the cover portion.

7. The hand-held type electric tool according to claim 6, wherein a right finger-rest portion and a left finger-rest portion are positioned at substantially the same level as the upper end of the cover portion.

8. The hand-held type electric tool according to claim 6, wherein the right fixation claw portion is disposed on the right side of the one battery cell, and the left fixation claw is disposed on the left side of the one battery cell.

9. The hand-held type electric tool according to claim 1, wherein the three battery cells are disposed on a lower side of the switch lever.

10. A hand-held type electric tool comprising:
    a tool main body extending in a forward and rearward direction;
    a handle housing extending downward from the tool main body;
    a chuck disposed on a front side of the tool main body;
    a switch lever disposed on the handle housing; and
    a rechargeable type battery pack; wherein:
    the handle housing is configured to receive at least a part of the rechargeable type battery pack:
    the rechargeable type battery pack includes three battery cells and a battery case, the battery case including a fixation claw portion, at least part of the battery case having a substantially triangular cross sectional configuration and being disposed within the handle housing;
    the three battery cells include one battery cell and two battery cells arranged on a rear side of the one battery cell,
    the handle housing has a substantially triangular cross sectional configuration corresponding to the triangular cross sectional configuration of the at least part of the battery case, the handle housing including i) an apex portion having a first curvature and being disposed on a front side of the handle housing and ii) a base portion having a second curvature which is smaller than the first curvature and being disposed on a rear side of the handle housing,
    in the substantially triangular cross sectional configuration, a maximum dimension of the handle housing in a direction perpendicular to the forward and rearward direction is located on a front side of a maximum dimension of the battery case where the two battery cells are disposed, and the fixation claw portion is located between the one battery cell and one of the two battery cells in the forward and rearward direction.

11. The hand-held type electric tool according to claim 10, wherein the battery case includes a cover portion and the fixation claw portion, wherein the fixation claw portion can be used to attach the rechargeable type battery pack to the handle housing.

12. The hand-held type electric tool according to claim 11, wherein the fixation claw portion includes a right fixation claw disposed on a right side of the rechargeable type battery pack, and a left fixation claw disposed on a left side of the rechargeable type battery pack.

13. The hand-held type electric tool according to claim 12, further comprising an electric motor disposed within the tool main body and located on an upper side of the rechargeable type battery pack.

14. The hand-held type electric tool according to claim 13, wherein the handle housing includes an apex portion situated on a front side of the handle housing and a base portion situated on a rear side of the handle housing.

15. The hand-held type electric tool according to claim 12, wherein the battery case further includes a right finger-rest portion disposed on a lower side of the right fixation claw, and a left finger-rest portion disposed on a lower side of the left fixation claw.

16. The hand-held type electric tool according to claim 15, wherein the right finger-rest portion includes right ribs, and the left finger-rest portion includes left ribs.

17. The hand-held type electric tool according to claim 12, wherein the cover portion is disposed at a lower portion of the battery case and has an upper end and a lower end, and wherein the right fixation claw and the left fixation claw are both disposed above the upper end of the cover portion.

18. The hand-held type electric tool according to claim 17, wherein a right finger-rest portion and a left finger-rest portion are positioned at substantially the same level as the upper end of the cover portion.

19. The hand-held type electric tool according to claim 17, wherein the right fixation claw portion is disposed on the right side of the one battery cell, and the left fixation claw is disposed on the left side of the one battery cell.

20. The hand-held type electric tool according to claim 10, wherein the three battery cells are disposed on a lower side of the switch lever.

* * * * *